United States Patent
Somasundaram et al.

(10) Patent No.: US 8,078,739 B1
(45) Date of Patent: Dec. 13, 2011

(54) SOLUTION FOR HANDLING URL-SUBSTITUTION FOR DATA ACCESS IN A PRIVATE NETWORK ARCHITECTURE

(75) Inventors: Mahadev Somasundaram, Santa Clara, CA (US); Senthil Sivakumar, Sunnyvale, CA (US); Siva S. Jayasenan, Cupertino, CA (US); Yongming Zhang, San Jose, CA (US); Todd M. Short, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 1240 days.

(21) Appl. No.: 10/750,513

(22) Filed: Dec. 29, 2003

(51) Int. Cl.
*G06F 15/16* (2006.01)

(52) U.S. Cl. ........ 709/229; 709/228; 709/227; 709/230; 709/231; 709/224

(58) Field of Classification Search ................ 709/203, 709/217–219, 229, 226, 246, 231, 230, 227, 709/228
See application file for complete search history.

(56) References Cited

U.S. PATENT DOCUMENTS

| | | | | |
|---|---|---|---|---|
| 6,052,730 | A * | 4/2000 | Felciano et al. | 709/225 |
| 6,640,302 | B1 * | 10/2003 | Subramaniam et al. | 713/169 |
| 7,085,817 | B1 * | 8/2006 | Tock et al. | 709/217 |
| 2004/0039827 | A1 * | 2/2004 | Thomas et al. | 709/228 |

OTHER PUBLICATIONS

B. Aboba, et al., "IPsec-Network Address Translation (NAT) Compatibility Requirements," Copyright the Internet Society (2004). RFC 3715. pp. 1-17.
S. Kent, et al., "Security Architecture for the Internet Protocol," Copyright the Internet Society (1998). RFC 2401. pp. 1-62.
P. Hoffman, et al., "SMTP Service Extension for Secure SMTP Over Transport Layer Security," Copyright the Internet Society (2002). RFC 3207. pp. 1-9.

* cited by examiner

*Primary Examiner* — Jeffrey Pwu
*Assistant Examiner* — Abdelnabi Musa
(74) *Attorney, Agent, or Firm* — Weaver Austin Villeneuve & Sampson LLP (57) ABSTRACT

Disclosed are methods and apparatus for handling requests for data from a private network. In general terms, a client who wishes access to secure data, such as a secure web page, from a private network establishes a secure connection with a secure server, such as a secure socket layer (SSL) server, of the private network. The secure server then downloads a software program for handling data requests (made by the client for data located within the private network) to the client. This software program is downloaded automatically by the secure server to the client when the client initiates a secure connection with such secure server. The downloaded software program is generally configured to modify data requests (e.g., by performing a URL substitution) sent from the client to an internal server of the private network such that the data requests are redirected to the secure server. The secure server then processes the data request (e.g., by retrieving the data from the appropriate internal server).

56 Claims, 7 Drawing Sheets

SOLUTION FOR HANDLING URL-SUBSTITUTION FOR DATA ACCESS IN A PRIVATE NETWORK ARCHITECTURE

BACKGROUND OF THE INVENTION

The present invention relates to methods and apparatus for processing data within a computer network. More specifically, it relates to handling requests for data, such as web pages, from a private network, such a virtual private network (VPN).

Figure 1:
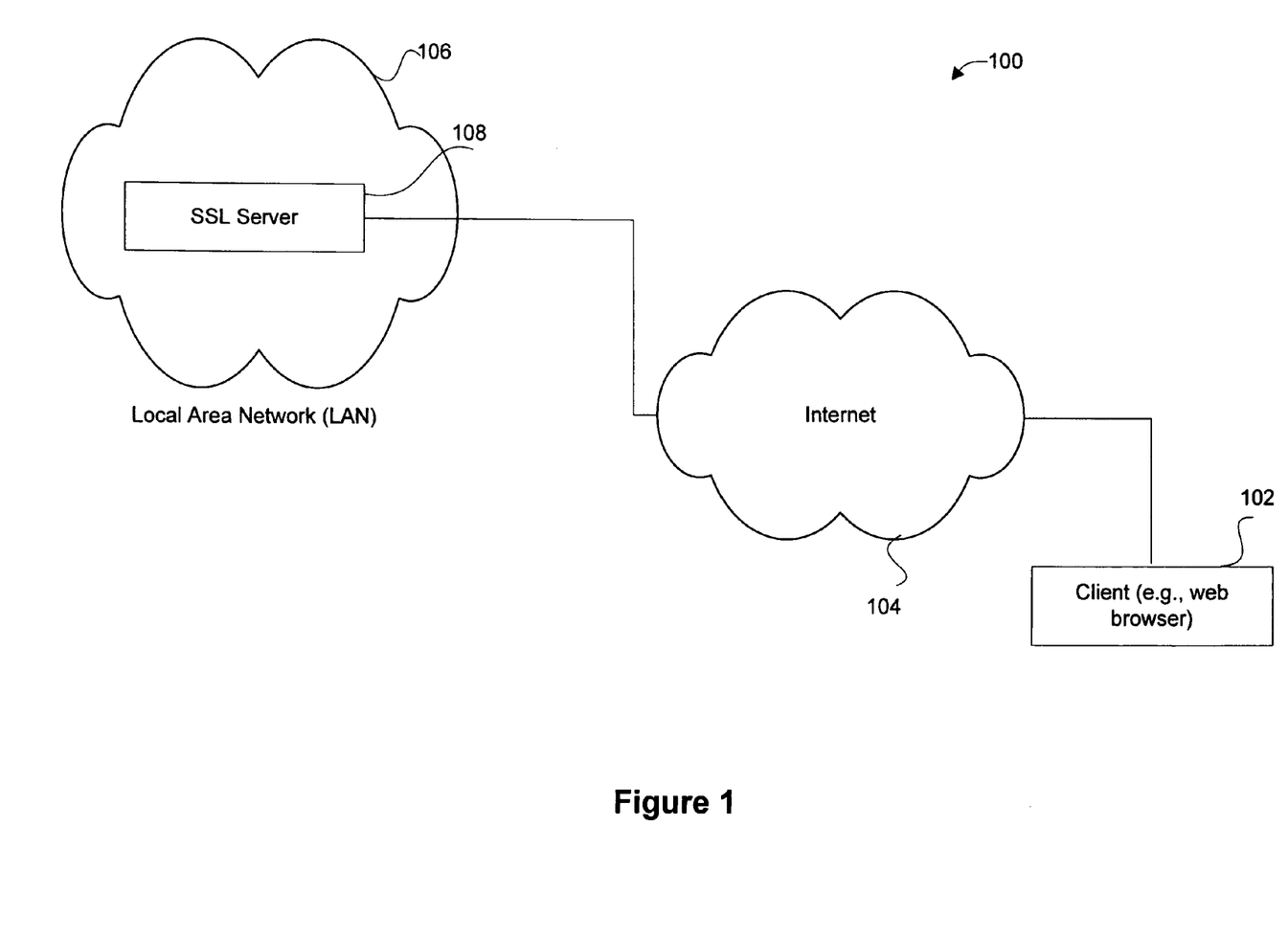
FIG. 1 is a diagrammatic representation of a network having a secure socket layer (SSL) server which is accessible by one or more clients.

FIG. 1 is a diagrammatic representation of a network 100 having a secure socket layer (SSL) enabled HTTP server 108 which is accessible by one or more clients. In one example, the SSL enabled HTTP server 108 is a commercial bank's customer server located within its banking network 106. A client 102 may access data from SSL enabled HTTP server 110 through a secure SSL connection. In the banking example, a bank customer may access account information from the SSL enabled HTTP server of his/her banking network using his home personal computer (PC). The client can typically access data within the private network through a connection device, such as a dial-up modem, DSL, cable modem, etc. The client generally uses a web browser to establish a connection with a SSL enabled HTTP server.

In the banking example, banking customer 102 inputs the URL www.mybank.com via their web browser. The URL www.mybank.com is resolved to the address of the SSL enabled HTTP server 108 of the client's banking network 106. When the request for the initial web page is sent to the SSL enabled HTTP server 108, the SSL enabled HTTP server negotiates a secure protocol (e.g., the client is authenticated and encryption is used for the message sent thereafter on the connection) with the client and then presents an initial web page to the client 102. The SSL enabled HTTP server 108 may also be configured to perform a secure setup, e.g., via a log in procedure, with client 102. In the banking case, the customer client 102 may click on a "logon" link on the initial web page to begin the secure setup process, where a user name and password is authenticated by the SSL enabled HTTP server 108.

This server arrangement provides a secure connection between a server and a client. However, this SSL enabled HTTP server arrangement has disadvantages. For instance, the client can only access data or information on servers which are configured to negotiate an SSL connection. Also, if a particular SSL enabled HTTP server becomes overloaded with information, another server must be configured as an SSL enabled HTTP server.

Figure 2:
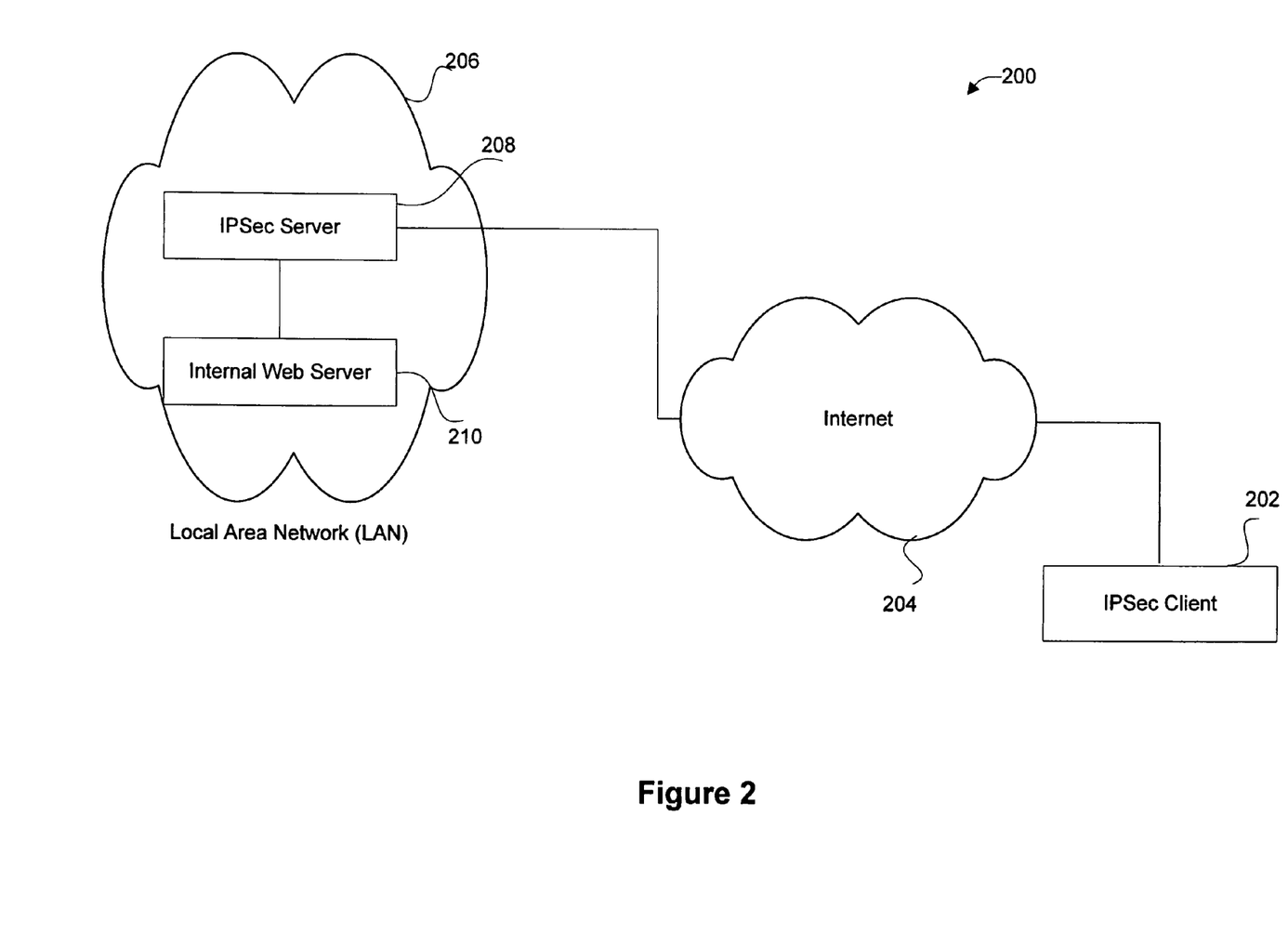
FIG. 2 is a diagrammatic representation of a network which includes an IPSec Server which is configured to set up a tunnel with a client so that the client may access other internal servers.

FIG. 2 is a diagrammatic representation of a network 200 which includes an IPSec Server 208 which is configured to set up a tunnel with a client 202 so that the client may access other internal servers. Each client 202 which wishes to access data in the private network 206 of the IPSec server 208 must be configured with an IPSec client which can communicate with the IPSec server 208. Said in another way, an IPSec client is configured on the user's computer. The user initiates the IPSec client to communicate with the IPSec server 208, which then sets up a tunnel between the client 202 and the private network 206. Once a tunnel is set up by the IPSec server 208 with the client 202, the client 202 can access information or data within the private network 206 as if the client 202 is sitting within the private network 206. In this arrangement, the client 202 may also include any number of applications which may access the private network 206, such as an internal server 210.

One disadvantage of an IPSec arrangement is that each client has to be customized with IPSec client software in order to interface with the private network 206. In other words, the IPSec client software must be tailored to each client's machine. Accordingly, a client cannot access components of the internal server 206 without having customized software installed on their client machine. Thus, a user cannot access the private network 206 from any computer (e.g., such as a computer at an Internet café), but only a computer which is specially configured. Additionally, one may wish to not allow specific clients to access the complete resources in the private network 106. That is, restriction on particular data and/or servers within the private network may be desired. In one example, a business may wish to restrict a business partner to have access to only a subset of data within the private network.

Figure 3:
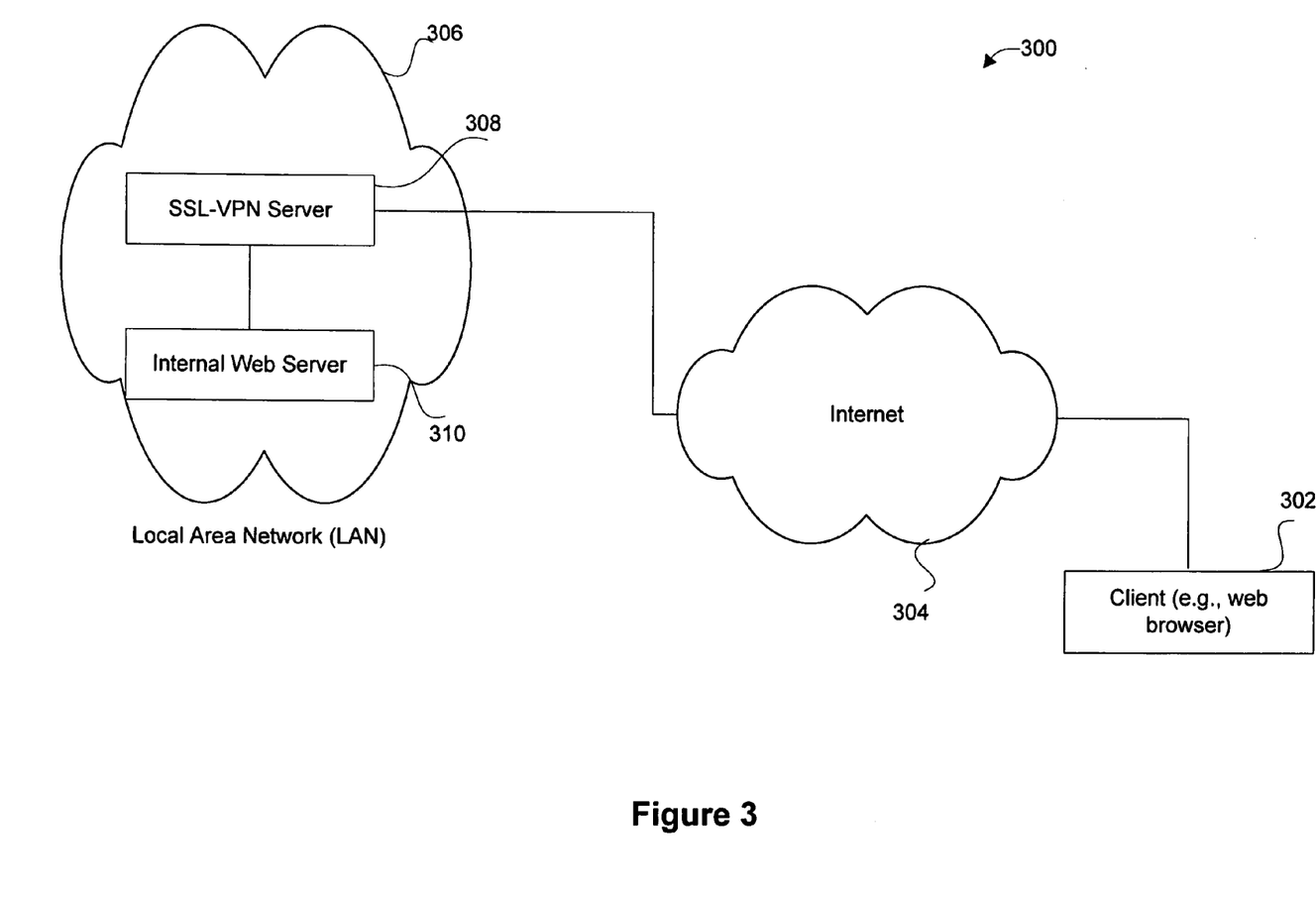
FIG. 3 is a diagrammatic representation of a network which includes an SSL-VPN (virtual private network) server.

FIG. 3 is a diagrammatic representation of a network 300 which includes an SSL-VPN (virtual private network) server 308. In this type of network, the client 302 may access resources on the private network 306 from any computer that supports SSL. In general, a browser of the client 306 makes an initial request for an initial web page to the SSL-VPN server 308. An SSL session then commences between the server 308 and client 302. This SSL session may include authentication of client 302.

After the SSL session completes, the user may then access links within the initial web page. However, prior to sending the initial web page to the client, the SSL-VPN server 308 has substituted URL's for each of the links embedded in the initial web page so that the links correspond to the SSL-VPN server 308. The links may have initially referenced the URL of internal server 310 of private network 306. However, the client 302 is not allowed to access internal server 310 of private network 306. Data on internal server 310 may only be accessed through SSL-VPN server 308. When the client 302 clicks on a link of the initial web page, the request is directed to the SSL-VPN server 308, which then may retrieve the appropriate web page from within the private network 306, e.g., from internal web server 310 and forward it to the client, (if the client is authorized to access the web page).

This arrangement has several disadvantages. For example, the SSL-VPN server 308 has to be configured to recursively substitute addresses for each web page link on each web page. As the number of clients increase, the number of substitutions increase significantly. Unfortunately, the performance of the SSL-VPN server 308 tends to degrade with increased numbers of clients.

In view of the above, there is a need for improved mechanisms for securely handling requests by a client for data from a private network.

SUMMARY OF THE INVENTION

Accordingly, the present invention provides methods and apparatus for handling requests for data from a private network. In general terms, a client who wishes access to secure data, such as a secure web page, from a private network establishes a secure connection with a secure server, such as a secure socket layer (SSL) server, of the private network. The secure server then downloads a software program for handling data requests (made by the client for data located within the private network) to the client. This software program is downloaded automatically by the secure server to the client when the client initiates a secure connection with such secure server. The downloaded software program is generally configured to modify data requests (e.g., by performing a URL substitution) sent from the client to an internal server of the private network such that the data requests are redirected to the secure server. The secure server then processes the data request (e.g., by retrieving the data from the appropriate internal server).

In client side embodiment, a method for handling data requests by a client for data in an internal server of a private network is disclosed. The method includes (a) at the client, initiating communication to a secure server within the private network; (b) receiving a data request handling procedure at the client; and (c) at the data request handling procedure. Requests for data initiated by the client are intercepted and an address of the secure server is substituted for a portion of each data request that is being directed to the internal server of the private network. The substitution is performed so that the each data request is thereafter forwarded to the secure server instead of the internal server.

In specific implementations, each data request is a universal remote locator (URL) request for a web page or a request for a document. In a further aspect, the data request handling procedure is configured to perform URL substitution and is pushed to the client by the secure server after the client has initiated communication with the secure server. In one example, the data request handling procedure is received in the form of an applet.

In a further embodiment, the method include the operation of (d) associating the data request handling procedure with an instance of a browser which initiated communication to the secure server within the private network and (e) altering the proxy settings of the instance browser associated with the request handling procedure so that data requests are directed to a local address and port on which the request handling procedure is configured to listen. In a further aspect, the method includes repeating perations (a) through (e) for different initialized communications by the client to different secure servers.

In a specific implementation, the initiation of communication by the client utilizes a protocol which include encryption, such as achieved with the secure socket layer (SSL) protocol. In an alternative embodiment, the data requests are in the form of links embedded within an initial or portal web page presented to the client by the secure server and the links are intercepted by the data request handling procedure before the client selects a link. For example, the data request handling procedure performs an URL substitution for each link in a web page presented to the client.

In another embodiment, the invention pertains to a computer system operable to handle data requests by a client for data in an internal server of a private network. The computer system includes one or more processors and one or more memory. At least one of the memory and processors are adapted to provide at least some of the above described method operations. In yet a further embodiment, the invention pertains to a computer program product for handling data requests by a client for data in an internal server of a private network. The computer program product has at least one computer readable medium and computer program instructions stored within at least one of the computer readable product configured to perform at least some of the above described method operations.

In a secure server side embodiment, a method for a secure server within a private network to handle data requests sent from a client for data located on an internal server located within a private network is disclosed. At the secure server, an initiation of communication from the client to the secure server is received. After receiving the initiation of communication, a data request handling procedure is sent to the client. The data request handling procedure is configured to intercept requests for data initiated by the client and substitute an address of the secure server for a portion of each data request that is being directed to the internal server of the private network, and the substitution is performed so that the data request is thereafter forwarded to the secure server instead of the internal server.

In a specific implementation, the data requests are URL requests for web pages on the internal server of the private network, and an initial web page is sent to the client during or after the client initiates communication with the secure client. The initial web page is sent by the secure server without performing a universal remote locator (URL) substitution on a link embedded within the initial web page. In another aspect, a secure connection is set up between the secure server and the client, and a user profile which indicates data access rights for the client is obtained.

In another embodiment, a first data request for data is received from the client. The data is located on the internal server of the private network. It is then determined whether the client is authorized to access the data based on the obtained user profile. The requested data is sent to the client only if it is determined that the client is authorized to access the data. In a specific aspect, the data request handling procedure is in the form of an applet downloaded to the client. In another aspect, the initiation of communication by the client is in the form of a secure protocol, such as the secure socket layer (SSL) protocol.

In another embodiment, the invention pertains to a computer system operable to handle data requests sent from a client for data located on an internal server located within a private network. The computer system includes one or more processors and one or more memory. At least one of the memory and processors are adapted to provide at least some of the above described method operations. In yet a further embodiment, the invention pertains to a computer program product for handling data requests sent from a client for data located on an internal server located within a private network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one specific embodiment, URL substitution is pushed to the client side. A URL substitution program is downloaded to a client when it first connects to a secure server, such as an SSL-VPN server. In one specific implementation, the SSL-VPN server pushes a Java applet to the client during or after set up of an SSL session with the client. This URL substitution program is configured to intercept web page requests from the client and substitute a URL address which corresponds to the SSL-VPN server to replace a web page address which corresponds to an internal server within the same private network as the SSL-VPN server. This arrangement distributes the computationally intensive task of URL substitution to the clients, rather than concentrating it at a single server.

Although the present invention is described in the context of URL address substitution, of course, any suitable addressing scheme may be modified in data requests so that data requests initiated by a client to an internal private server are redirected to a secure server. Additionally, although the present invention is described as using the SSL and VPN protocols, it may be easily extended to other secure protocols and types of private networks. Any suitable type of security protocol may be implemented on the secure server of a private network for secure communication with an outside client.

A secure protocol will generally include encryption of at least a portion of messages sent between the secure server and the outside client. Two general categories of encryption include symmetric encryption and public key encryption. In symmetric key encryption, the secure server and client encrypt messages to each other with a common secret key. In public key encryption, a combination of private and public keys are used. Public key encryption includes the Pretty Good Privacy (PGP) scheme, a digital certificate scheme, etc. A popular implementation of the digital certificate scheme is SSL or the Transport Layer Security (TLS) protocol. The key in public key encryption is typically based on a hash value. This is a value that can be computed from a base input number using a hashing algorithm. Essentially, the hash value is a summary of the original value. The important thing about a hash value is that it is nearly impossible to derive the original input number without knowing the data used to create the hash value.

Figure 4:
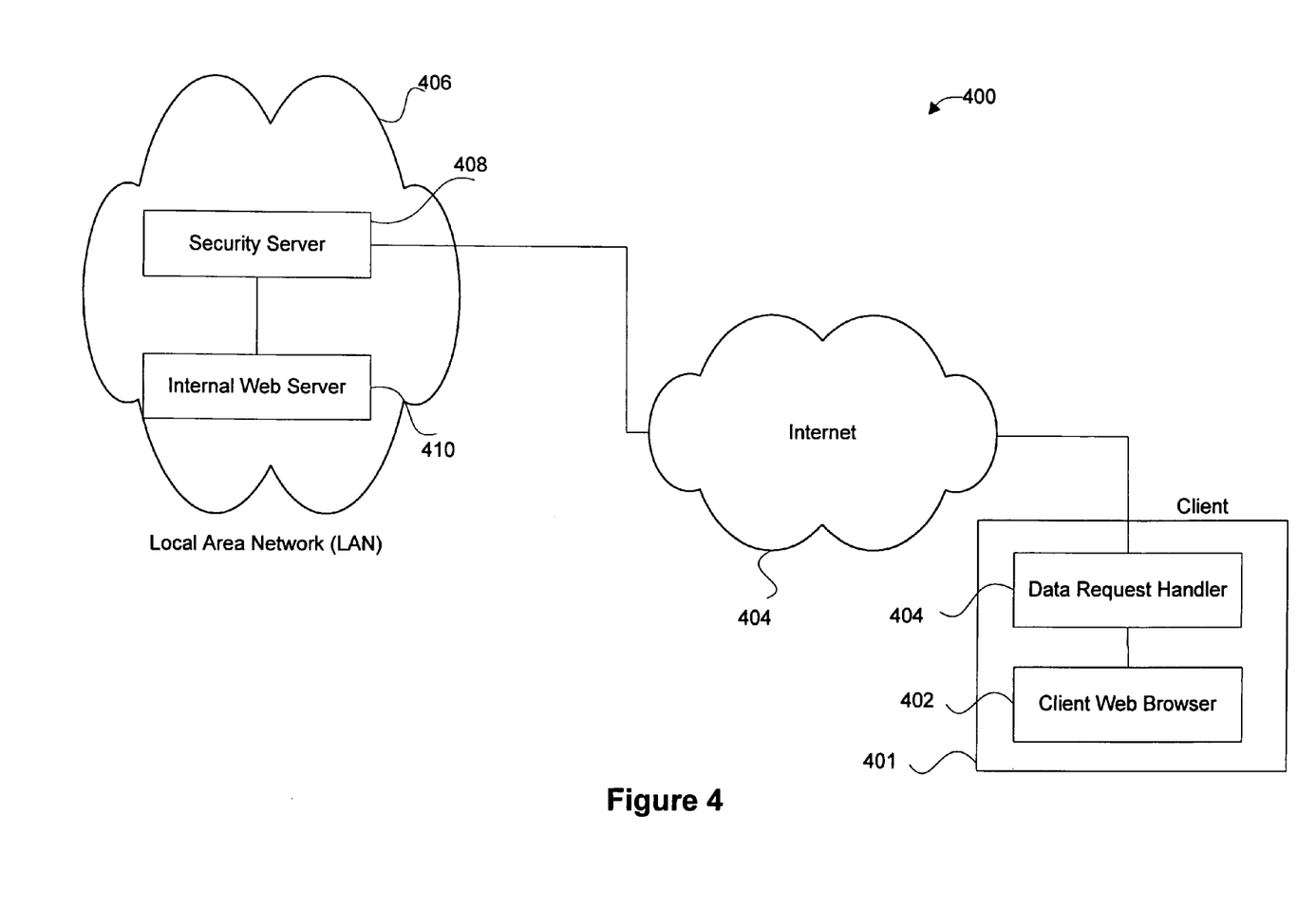
FIG. 4 is a diagrammatic representation of a network for implementing techniques of the present invention in accordance with one embodiment of the present invention.
Figure 5:
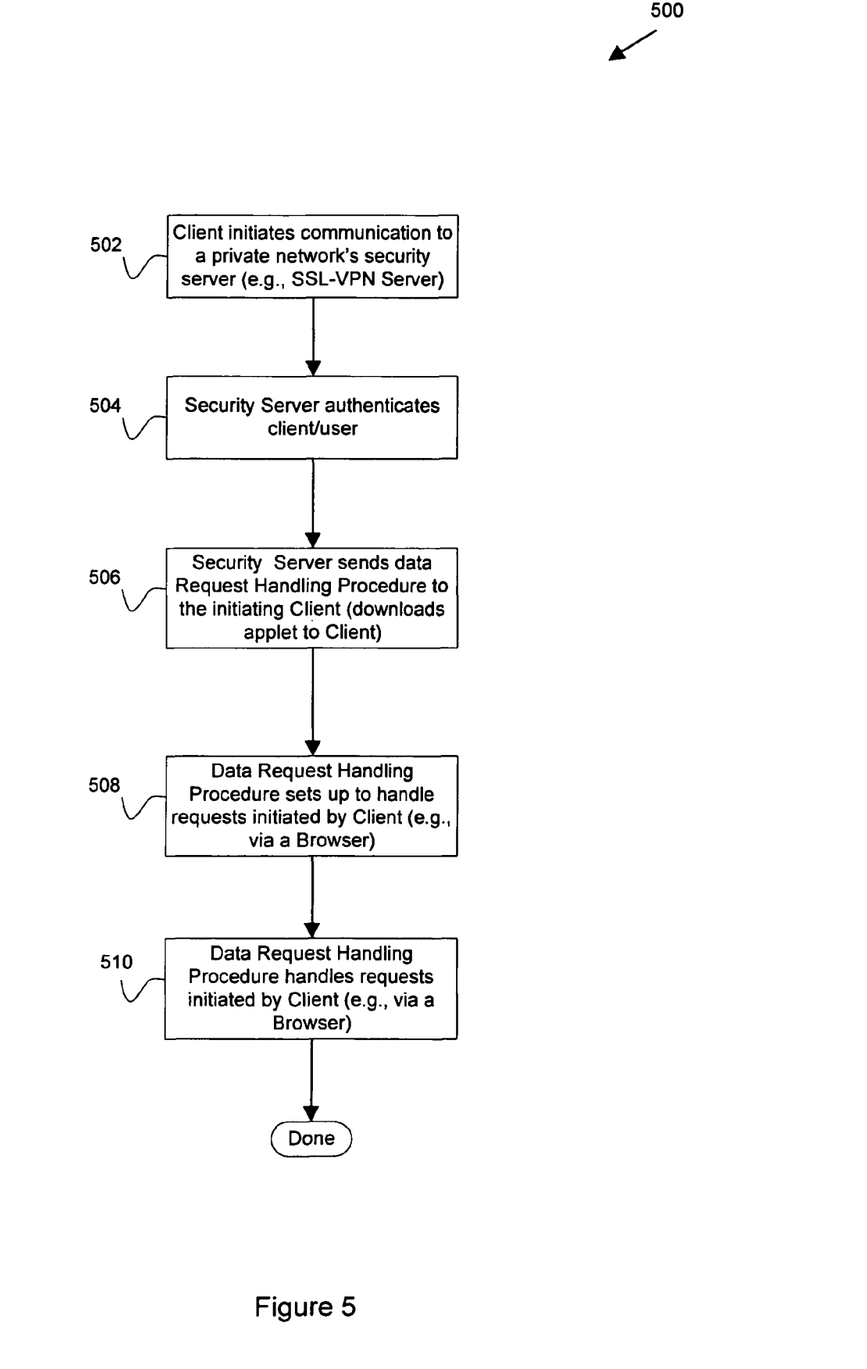
FIG. 5 is a flowchart illustrating a procedure for handling data requests by a client for data within a private network in accordance with one embodiment of the present invention.

FIG. 4 is a diagrammatic representation of a network 400 for implementing techniques of the present invention in accordance with one embodiment of the present invention. This diagram will be explained in conjunction with the procedure of FIG. 5. FIG. 5 is a flowchart illustrating a procedure 500 for handling data requests by a client for data within a private network in accordance with one embodiment of the present invention. Initially, client 401 initiates communication to a private network's (e.g., 406) security server 408 in operation 502, for example, by accessing a secure web page via clicking on a "logon" link in an initially accessed portal web page. The secure server may take the form of any suitable type of server for handling security and authentication between a server and client. For example, the security server may be in the form of an SSL-VPN server.

After the client initiates communication, the security server may then authenticate the client or user in operation 504. More generally, the security server sets up a secure connection between itself and the client. In an SSL application, the browser instance of the client and the SSL server exchange and verify preconfigured authentication certificates. An SSL tunnel is then formed between the SSL server and the client, for example, by verification of a client's user name and password (e.g., input by the user into a login web page). A user profile may also be obtained at this point based on the user name and password. Use of the user profile for a particular client is further described below.

The security server then sends a data request handling procedure to initiating client (i.e., the client which initiated the secure session with the secure server) in operation 506. For example, an applet for performing URL substitution is downloaded to the client 401 in operation 506. The secure server 408 may also ask permission from the client or user before downloading the data request handling procedure to the client.

The data request handling procedure then sets up to handle requests initiated by the client 401 (e.g., via a client browser 402) in operation 508. For instance, the proxy settings of the client web browser which initiated the secure session are modified to reference a local address and port of the client device. Data requests, such as request for web pages, are then forwarded to this local address and port. The data request handling procedure is configured to listen to this local address and port. The data request handling procedure can then intercept and handle requests initiated by the client 401 (e.g., via a client browser 402) in operation 510. The procedure 500 then ends, for example, when the corresponding browser instance becomes inactive or the corresponding secure session terminates. The data request handling procedure (e.g., applet) and its associated structures and procedures (e.g., threads) may also be deleted or terminated when the corresponding browser instance or secure session is terminated.

A data request which is initiated by the client may be any suitable form for requesting data, such as a request for a document or web page. In one embodiment, the SSL server presents an initial web page to the user after the secure session (e.g., SSL session) is set up between the SSL server and the client. The secure server presents this initial web page to the client without performing any URL substitutions on the links in such initial web page. That is, the addresses to internal server(s) of the private network which are referenced by the initial web page's links are kept intact. In sum, the SSL server is not performing computationally intensive URL substitutions and, accordingly, its computation load is significantly reduced as compared with convention SSL-VPN servers.

In one implementation, the data request handling procedure is configured to intercept requests only from the web browser instance which initiated the secure session. That is, the web browser instance which caused the data request handling procedure to be downloaded will have its proxy setting modified as described above. Thus, a specific request handling procedure will listen to a local address and port associated with a particular browser instance. With this arrangement, a single client can have multiple browser instances which are requesting data from different private networks. In this latter situation, a data request handling procedure is downloaded for each private network and its corresponding browser instance. Each data request handling procedure then preferably sets up its associated browser instance with a different proxy address and port.

In general, the data request handling procedures modifies requests so that they are redirected to the secure server. That is, addresses of links which reference an internal server of the private network are modified to reference the secure server of the private network. In one embodiment, the data request handling procedure performs URL substitution on web page requests by the client. The URL address of the secure server is substituted for each address of an internal server.

In one implementation, URL substitution includes manipulating the protocol, host, port and path elements of the data request URL sent by the client's browser. The protocol element is replaced with an "https" to indicate a secure session. The host and port are replaced with the DNS name or IP address of the secure server. The path in the URL is prefixed with the new protocol and DNS name or IP address, as well as a flag to indicate special operations that are to take place for processing this URL request.

It is well understood that a private network may include any number and type of servers and data processing devices. For instance, a private network may include multiple internal servers which are not accessible by outside clients as well as multiple secure servers for handling secure connections with outside clients as described above.

Figure 6:
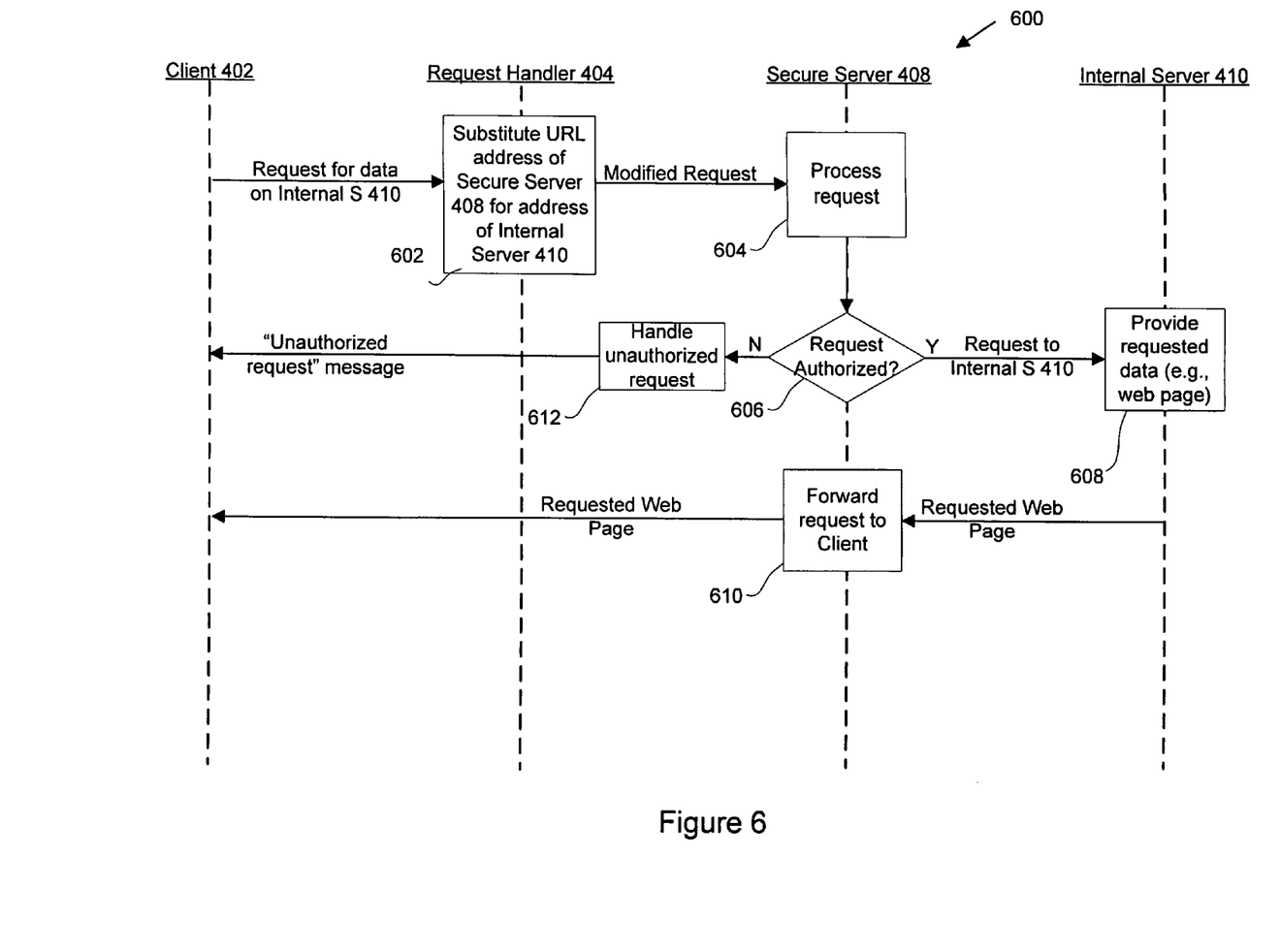
FIG. 6 is a communication diagram illustrating data from a private network being securely accessed by a client in accordance with one embodiment of the present invention.

FIG. 6 is a communication diagram 600 illustrating data from a private network 406 being securely accessed by a client 402 in accordance with one embodiment of the present invention. Initially, the client 402 makes a request for data on internal server 410. A request for data may take any suitable form for accessing data such as a URL request for a document or web page. In a specific example, a user clicks on a link of the initial or portal web page which was sent by the secure server. The link may reference an URL or IP address of an internal server of the private network 406.

The request initiated by the client is intercepted by request handler 404, e.g., because the request handler is listening for data requests on the proxy local address and port which was previously set up for the client's web browser. In a specific embodiment, the request handler 404 substitutes a URL address of the secure server 408 for an address of an internal server of the private network 406 within the request.

Although URL substitution is described as only being performed for each web page request initiated by a client browser, the URL substitution may be proactively performed on each embedded link of a web page which is downloaded to the client. When the initial web page is sent to the client by the secure server, each link address may be replaced with the URL of the secure server before the user clicks on such link.

Referring back to the illustrated embodiment, the modified request is then forwarded to the secure server 408. The secure server 408 then processes the request in operation 604. It may then be determined whether the request is authorized in operation 606. For example, a user profile may be configured for each client (e.g., on an AAA server of the private network), and such user profile is accessible by the secure server 408. The user profile may list access right or restrictions for specific users. The secure server can determine whether the particular requesting client 402 is authorized to access the particular requested web page based on the user profile for such client 402. In one implementation, a user name and password may be matched with a particular user profile. One example user profile may specify that the particular client 402 is not authorized to access a particular set of web pages or server. Alternatively, the user profile may simply specify which clients are authorized to access a particular web page or server.

If the request is authorized, the secure server 408 then sends the request to the internal server 410. The internal server 410 then provides the requested data, such as the requested web page, to the secure server 408 in operation 608. The secure server 408 then forwards the requested data (e.g., web page) to the client in operation 610.

If the request is not authorized, the unauthorized request is then handled in operation 612. Unauthorized request handling may include any suitable procedure for handling unauthorized requests. In one embodiment, an "unauthorized request" message is sent to the client 402. Alternatively, the secure server may delete links to which the client is not authorized from the initial web page, as well as subsequent pages, sent to the client.

The internal web server on which the web page resides may determine whether a client is authorized for a particular web page, instead of the secure server. If a particular web page requested by the client via the secure server is not authorized for the particular client, the web server may send an error message to the secure server, which is then forwarded to the client. Alternatively, the web server may simply not provide the requested unauthorized web page.

Generally, the techniques for securely handling data requests of the present invention may be implemented on software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, portions of the data request handling system (e.g., secure server 408, web server 410, or client 401) may be implemented on a general-purpose network host machine such as a personal computer or workstation. Further, the invention may be at least partially implemented on a card (e.g., an interface card) for a network device or a general-purpose computing device.

Figure 7:
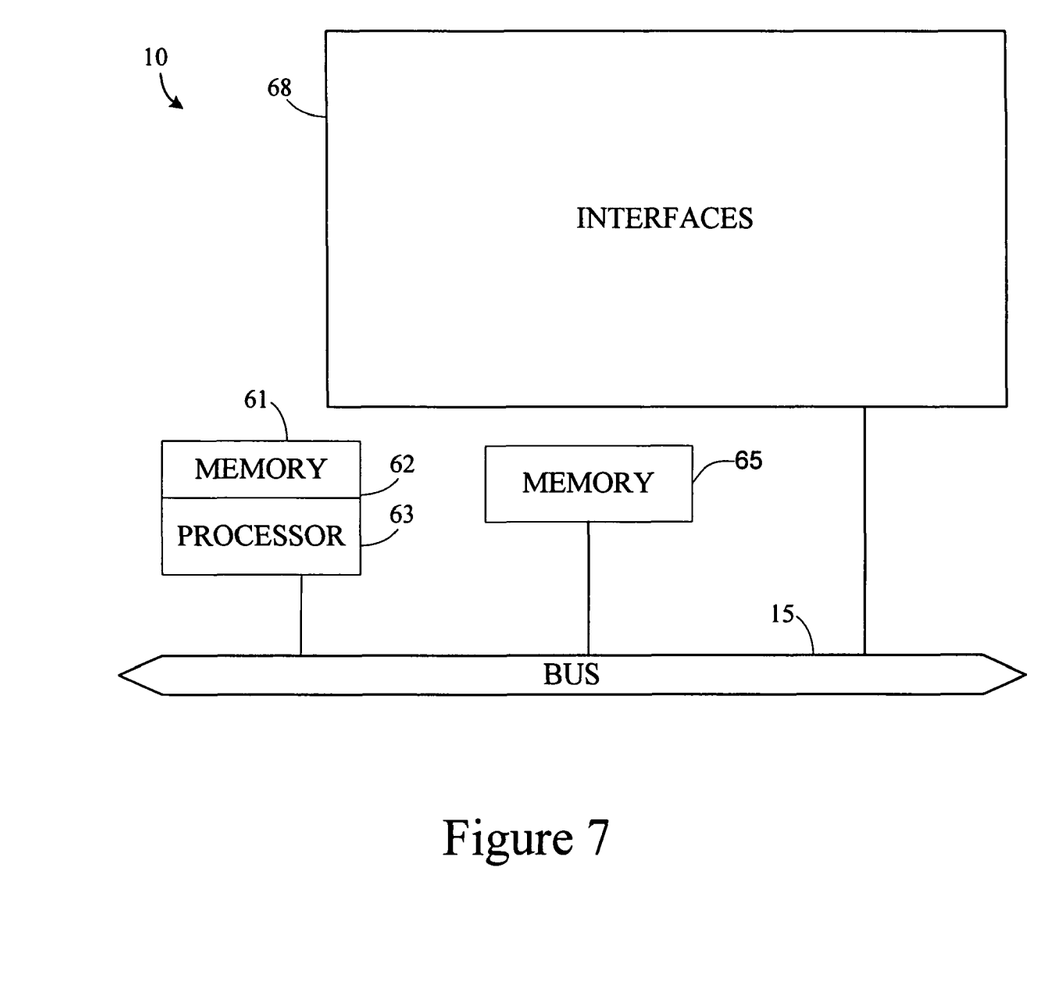
FIG. 7 is a diagrammatic representation of an example computer system in which embodiments of the present invention may be implemented.

Referring now to FIG. 7, a computer system 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing URL substitution on data requests at a client or downloading a URL substitution program to a client, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store an address for each internal server and secure server of each private network, a data request handling or URL substitution program, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling data requests by a client for data in an internal server of a private network, the method comprising:
    (a) at the client, initiating communication to a secure server within the private network;
    (b) receiving a data request handling procedure at the client such that the data request handling procedure is automatically downloaded to the client when the client connects to the secure server within the private network, wherein the data request handling procedure is automatically downloaded to the client by the secure server without user input from the client;
    (c) at the client, by the data request handling procedure, intercepting requests for data initiated by the client and substituting an address of the secure server for a portion of each data request that is being directed to the internal server of the private network, wherein the substitution is performed so that the each data request is thereafter forwarded to the secure server instead of the internal server;
    wherein each of the data requests is a universal remote locator (URL) request for a web page, wherein the data requests are in the form of links embedded within an initial web page presented to the client by the secure server;
    (d) performing URL substitution by the data request handling procedure at the client after the data request handling procedure has been downloaded to the client such that each of the links embedded within the initial web page presented to the client by the secure server is replaced with a URL of the secure server, wherein performing URL substitution is performed prior to the selection by the client of one of the links embedded within the initial web page; and
    (e) associating the data request handling procedure with an instance of a browser which initiated communication to the secure server within the private network, and automatically altering the proxy settings of the instance of the browser associated with the request handling procedure so that data requests are directed to a local address and port on which the request handling procedure is configured to listen.

2. A method as recited in claim 1, wherein each data request is a request for a document.

3. A method as recited in claim 1, wherein the data request handling procedure is received in the form of an applet.

4. A method as recited in claim 1, further comprising repeating operations (a) through (e) for different initialized communications by the client to different secure servers.

5. A method as recited in claim 1, wherein the initiation of communication by the client utilizes a protocol which include encryption.

6. A method as recited in claim 5, wherein the initiation of communication by the client utilizes a secure socket layer (SSL) protocol.

7. A client computer system operable to handle data requests by the client for data in an internal server of a private network, the computer system comprising:
one or more processors
one or more memory, wherein at least one of the processors or memory are adapted for:
(a) initiating communication to a secure server within the private network;
(b) receiving a data request handling procedure such that the data request handling procedure is automatically downloaded to the client when the client connects to the secure server within the private network, wherein the data request handling procedure is automatically downloaded to the client by the secure server without user input from the client;
(c) at the client, by the data request handling procedure, intercepting requests for data initiated by the client and substituting an address of the secure server for a portion of each data request that is being directed to the internal server of the private network, wherein the substitution is performed so that the data request is thereafter forwarded to the secure server instead of the internal server;
wherein each of the data requests is a universal remote locator (URL) request for a web page;
(d) performing URL substitution by the data request handling procedure at the client after the data request handling procedure has been downloaded to the client such that each URL embedded within a web page presented to the client by the secure server is replaced with a URL of the secure server, wherein performing URL substitution is performed prior to the selection by the client of a URL embedded within the web page; and
(e) associating the data request handling procedure with an instance of a browser which initiated communication to the secure server within the private network, and automatically altering the proxy settings of the instance of the browser associated with the request handling procedure so that data requests are directed to a local address and port on which the request handling procedure is configured to listen.

8. A client computer system as recited in claim 7, wherein each data request is a request for a document.

9. A client computer system as recited in claim 7, wherein the data request handling procedure is received in the form of an applet.

10. A client computer system as recited in claim 7, wherein at least one of the processors and memory are further adapted for repeating operations (a) through (e) for different initialized communications by the client to different secure servers.

11. A client computer system as recited in claim 7, wherein the initiation of communication by the client utilizes a protocol which include encryption.

12. A client computer system as recited in claim 11, wherein the initiation of communication by the client utilizes a secure socket layer (SSL) protocol.

13. A client computer system as recited in claim 7, wherein the data requests are in the form of links embedded within an initial web page presented to the client by the secure server and the links are intercepted by the data request handling procedure before the client selects a link, wherein the data request handling procedure is configured to perform URL substitution such that each of the links is replaced with a URL of the secure server prior to the selection by the client of one of the links embedded within the initial web page.

14. A non-transitory computer storage medium for handling data requests by a client for data in an internal server of a private network, the computer storage medium comprising:
computer program instructions stored within the computer storage medium configured for:
(a) at the client, initiating communication to a secure server within the private network;
(b) receiving a data request handling procedure at the client such that the data request handling procedure is automatically downloaded to the client when the client connects to the secure server within the private network, wherein the data request handling procedure is automatically downloaded by the secure server to the client without user input from the client;
(c) at the client, by the data request handling procedure, intercepting requests for data initiated by the client and substituting an address of the secure server for a portion of each data request that is being directed to the internal server of the private network, wherein the substitution is performed so that the data request is thereafter forwarded to the secure server instead of the internal server;
wherein each of the data requests is a universal remote locator (URL) request for a web page;
wherein the data request handling procedure is configured to perform URL substitution of each URL request such that the URL request is modified or replaced to include a URL of the secure server;
(d) performing URL substitution by the data request handling procedure at the client after the data request handling procedure has been downloaded to the client such that each URL embedded within a web page presented to the client by the secure server is modified or replaced to include a URL of the secure server, wherein performing URL substitution is performed prior to the selection by the client of a URL embedded within the web page; and
(e) associating the data request handling procedure with an instance of a browser which initiated communication to the secure server within the private network, and automatically altering the proxy settings of the instance of the browser associated with the request handling procedure so that data requests are directed to a local address and port on which the request handling procedure is configured to listen.

15. A non-transitory computer storage medium as recited in claim 14, wherein each data request is a request for a document.

16. A non-transitory computer storage medium as recited in claim 14, wherein the data request handling procedure is received in the form of an applet.

17. A non-transitory computer storage medium as recited in claim 14, wherein the computer program instructions stored within the computer storage medium are further configured for: repeating operations (a) through (e) for different initialized communications by the client to different secure servers.

18. A non-transitory computer storage medium as recited in claim 14, wherein the initiation of communication by the client utilizes a protocol which include encryption.

19. A non-transitory computer storage medium as recited in claim 18, wherein the initiation of communication by the client utilizes a secure socket layer (SSL) protocol.

20. A non-transitory computer storage medium as recited in claim 14, wherein the data requests are in the form of links embedded within an initial web page presented to the client by the secure server and the links are intercepted by the data request handling procedure before the client selects a link, wherein the data request handling procedure is configured to perform URL substitution such that each of the links is replaced with a URL of the secure server prior to the selection by the client of one of the links embedded within the initial web page.

21. An apparatus, comprising:
means for initiating communication to a secure server within a private network;
means for receiving a data request handling procedure such that the data request handling procedure is automatically downloaded to the apparatus when the apparatus connects to the secure server within the private network, wherein the data request handling procedure is automatically pushed by the secure server to the apparatus without user input;
means for at the data request handling procedure, intercepting requests for data initiated by the apparatus and substituting an address of the secure server for a portion of each data request that is being directed to the internal server of the private network, wherein the substitution is performed so that the data request is thereafter forwarded to the secure server instead of the internal server;
wherein each of the data requests is a universal remote locator (URL) request for a web page;
wherein the data request handling procedure is configured to perform URL substitution of each URL request such that the URL request is modified or replaced to include a URL of the secure server;
means for performing URL substitution by the data request handling procedure at the apparatus after the data request handling procedure has been downloaded to the apparatus such that each URL embedded within a web page presented to the client by the secure server is modified or replaced to include a URL of the secure server, wherein performing URL substitution is performed prior to the selection of a URL embedded within the web page; and
means for associating the data request handling procedure with an instance of a browser which initiated communication to the secure server within the private network, and automatically altering the proxy settings of the instance of the browser associated with the request handling procedure so that data requests are directed to a local address and port on which the request handling procedure is configured to listen.

22. A method for a secure server to handle data requests sent from a client for data located on an internal server located within a private network, the method comprising:
at the secure server, receiving an initiation of communication from the client to the secure server; and
after receiving the initiation of communication, automatically sending a data request handling procedure by the secure server to the client such that the data request handling procedure is automatically downloaded to the client when the client connects to the secure server, wherein the data request handling procedure is automatically sent by the secure server to the client without human intervention,
wherein the data request handling procedure is configured to intercept requests for data initiated by the client and substitute an address of the secure server for a portion of each data request that is being directed to the internal server of the private network, wherein the substitution is performed so that the data request is thereafter forwarded to the secure server instead of the internal server,
wherein the data request handling procedure is associated with an instance of a browser which initiated communication to the secure server within the private network, wherein the proxy settings of the instance of the browser associated with the request handling procedure are automatically altered so that data requests are directed to a local address and port on which the request handling procedure is configured to listen;
wherein each data request is a universal remote locator (URL) request for a web page;
wherein the data request handling procedure is configured to perform URL substitution of each URL request such that the URL request is modified to include a URL of the secure server;
wherein the data request handling procedure is configured to perform URL substitution at the client after the data request handling procedure has been downloaded to the client such that each URL embedded within a web page presented to the client by the secure server is modified or replaced to include a URL of the secure server, wherein performing URL substitution is performed prior to the selection of a URL embedded within the web page.

23. A method as recited in claim 22, wherein the data requests are URL requests for web pages on the internal server of the private network, the method further comprising:
sending an initial web page to the client during or after the client initiates communication with the secure client, wherein the initial web page is sent by the secure server without performing a universal remote locator (URL) substitution on a link embedded within the initial web page;
wherein the data request handling procedure is configured to perform URL substitution on links embedded within web pages presented to the client such that the links are each replaced with a URL of the secure server prior to the selection by the client of one of the links embedded within the initial web page.

24. A method as recited in claim 22, further comprising:
setting up a secure connection between the secure server and the client; and
obtaining by the secure server a user profile which indicates data access rights for the client.

25. A method as recited in claim 24, further comprising:
receiving by the secure server a first data request for data from the client, wherein the data is located on the internal server of the private network;
determining by the secure server whether the client is authorized to access the data based on the obtained user profile; and
sending by the secure server the requested data to the client only if it is determined that the client is authorized to access the data.

26. A method as recited in claim 22, wherein the data request handling procedure is in the form of an applet downloaded to the client.

27. A method as recited in claim 22, wherein the initiation of communication by the client is in the form of a secure protocol.

28. A method as recited in claim 27, wherein the initiation of communication by the client is in the form of a secure socket layer (SSL) protocol.

29. A secure server computer system operable to handle data requests sent from a client for data located on an internal server located within a private network, the computer system comprising:
one or more processors;
one or more memory, wherein at least one of the processors or memory are adapted for:
receiving an initiation of communication from the client to the secure server; and
after receiving the initiation of communication, automatically sending a data request handling procedure by the secure server to the client such that the data request handling procedure is automatically downloaded to the client when the client connects to the secure server, wherein the secure server is in the private network, wherein the data request handling procedure is automatically pushed by the secure server to the client without user input from the client,
wherein the data request handling procedure is configured to intercept requests for data initiated by the client and substitute an address of the secure server for a portion of each data request that is being directed to the internal server of the private network, wherein the substitution is performed so that the data request is thereafter forwarded to the secure server instead of the internal server, wherein the data request handling procedure is associated with an instance of a browser which initiated communication to the secure server within the private network, wherein the proxy settings of the instance of the browser associated with the request handling procedure are automatically altered so that data requests are directed to a local address and port on which the request handling procedure is configured to listen;
wherein each data request is a universal remote locator (URL) request for a web page;
wherein the data request handling procedure is configured to perform URL substitution of each URL request such that the URL request is modified to include a URL of the secure server;
wherein the data request handling procedure is configured to perform URL substitution at the client after the data request handling procedure has been downloaded to the client such that each URL embedded within a web page presented to the client by the secure server is modified or replaced to include a URL of the secure server, wherein performing URL substitution is performed prior to the selection of a URL embedded within the web page.

30. A secure server computer system as recited in claim 29, wherein the data requests are URL requests for web pages on the internal server of the private network, the method further comprising:
sending an initial web page to the client during or after the client initiates communication with the secure client, wherein the initial web page is sent by the secure server without performing a universal remote locator (URL) substitution on a link embedded within the initial web page;
wherein the data request handling procedure is configured to perform URL substitution on links embedded within web pages presented to the client such that the links are each replaced with a URL of the secure server prior to selection by the client of one of the links.

31. A secure server computer system as recited in claim 29, wherein at least one of the processors and memory are further adapted for:
setting up a secure connection between the secure server and the client; and
obtaining by the secure server a user profile which indicates data access rights for the client.

32. A secure server computer system as recited in claim 31, wherein at least one of the processors and memory are further adapted for:
receiving by the secure server a first data request for data from the client, wherein the data is located on the internal server of the private network;
determining by the secure server whether the client is authorized to access the data based on the obtained user profile; and
sending by the secure server the requested data to the client only if it is determined that the client is authorized to access the data.

33. A secure server computer system as recited in claim 29, wherein the data request handling procedure is in the form of an applet downloaded to the client.

34. A secure server computer system as recited in claim 29, wherein the initiation of communication by the client is in the form of a secure protocol.

35. A secure server computer system as recited in claim 34, wherein the initiation of communication by the client is in the form of a secure socket layer (SSL) protocol.

36. A secure server computer system as recited in claim 34, wherein the secure server computer system is configured with the secure protocol.

37. A secure server computer system as recited in claim 36, wherein the secure server computer system is configured with a secure socket layer (SSL) protocol.

38. A non-transitory computer storage medium for a secure server within a private network to handle data requests sent from a client for data located on an internal server located within a private network, the computer storage medium comprising:
computer program instructions stored within the computer storage medium configured for:
at the secure server, receiving an initiation of communication from the client to the secure server; and
after receiving the initiation of communication, automatically sending a data request handling procedure from the secure server to the client such that the data request handling procedure is automatically downloaded to the client when the client connects to the secure server, wherein the data request handling procedure is automatically sent by the secure server to the client without human intervention,
wherein the data request handling procedure is configured to intercept requests for data initiated by the client and substitute an address of the secure server for a portion of each data request that is being directed to the internal server of the private network, wherein the substitution is performed so that the data request is thereafter forwarded to the secure server instead of the internal server, wherein the data request handling procedure is associated with an instance of a browser which initiated communication to the secure server within the private network, wherein the proxy settings of the instance of the browser associated with the request handling procedure are automatically altered so that data requests are directed to a local address and port on which the request handling procedure is configured to listen;

wherein each data request is a universal remote locator (URL) request for a web page;

wherein the data request handling procedure is configured to perform URL substitution of each URL request such that the URL request is modified to include a URL of the secure server;

wherein the data request handling procedure is configured to perform URL substitution at the client after the data request handling procedure has been downloaded to the client such that each URL embedded within a web page presented to the client by the secure server is modified or replaced to include a URL of the secure server, wherein performing URL substitution is performed prior to the selection of a URL embedded within the web page.

39. A non-transitory computer storage medium as recited in claim 38, wherein the data requests are URL requests for web pages on the internal server of the private network, wherein the computer program instructions stored within the computer storage medium are further configured for:

sending an initial web page to the client during or after the client initiates communication with the secure client, wherein the initial web page is sent by the secure server without performing a universal remote locator (URL) substitution on a link embedded within the initial web page;

wherein the data request handling procedure is configured to perform URL substitution on links embedded within web pages presented to the client such that the links are each replaced with a URL of the secure server, wherein the URL substitution is performed prior to selection by the client of one of the links.

40. A non-transitory computer storage medium as recited in claim 38, wherein the computer program instructions stored within the computer storage medium are further configured for:

setting up a secure connection between the secure server and the client; and obtaining by the secure server a user profile which indicates data access rights for the client.

41. A non-transitory computer storage medium as recited in claim 40, wherein the computer program instructions stored within the computer storage medium are further configured for:

receiving by the secure server a first data request for data from the client, wherein the data is located on the internal server of the private network;

determining by the secure server whether the client is authorized to access the data based on the obtained user profile; and sending by the secure server the requested data to the client only if it is determined that the client is authorized to access the data.

42. A non-transitory computer storage medium as recited in claim 38, wherein the data request handling procedure is in the form of an applet downloaded to the client.

43. A non-transitory computer storage medium as recited in claim 38, wherein the initiation of communication by the client is in the form of a secure protocol.

44. A non-transitory computer storage medium as recited in claim 43, wherein the initiation of communication by the client is in the form of a secure socket layer (SSL) protocol.

45. An apparatus handling data requests sent from a client for data located on an internal server located within a private network, comprising:

means for receiving an initiation of communication from the client; and means for automatically sending a data request handling procedure by the apparatus to the client such that the data request handling procedure is automatically downloaded to the client when the client connects to the apparatus, wherein the data request handling procedure is automatically sent by the apparatus to the client without human intervention after receiving the initiation of communication from the client, wherein the data request handling procedure is configured to intercept requests for data initiated by the client and substitute an address of the apparatus for a portion of each data request that is being directed to the internal server of the private network, wherein the substitution is performed so that the data request is thereafter forwarded to the apparatus instead of the internal server, wherein the data request handling procedure is associated with an instance of a browser which initiated communication to the apparatus, wherein the proxy settings of the instance of the browser associated with the request handling procedure are automatically altered so that data requests are directed to a local address and port on which the request handling procedure is configured to listen;

wherein each data request is a universal remote locator (URL) request for a web page;

wherein the data request handling procedure is configured to perform URL substitution of each URL request such that the URL request is modified to include a URL of the apparatus;

wherein the data request handling procedure is configured to perform URL substitution at the client after the data request handling procedure has been downloaded to the client such that each URL embedded within a web page presented to the client by the secure server is modified or replaced to include a URL of the secure server, wherein performing URL substitution is performed prior to the selection of a URL embedded within the web page.

46. The method as recited in claim 1, wherein the data request handling procedure is configured to perform URL substitution of each URL request such that the URL request includes a flag to indicate that special operations are to take place for processing the URL request.

47. The method as recited in claim 1, wherein the URL substitution includes manipulating a protocol element of each URL request.

48. The method as recited in claim 47, wherein the protocol element is replaced with "https" to indicate a secure session.

49. The apparatus as recited in claim 45, wherein the data request handling procedure is configured to perform an URL substitution for each link embedded in a web page presented to the client by the apparatus such that the link is replaced with a URL of the secure server prior to selection by the client of a link embedded within the web page.

50. The non-transitory computer storage medium as recited in claim 38, wherein the data request handling procedure is configured to perform an URL substitution for each link embedded in a web page presented to the client by the secure server such that the link is replaced with a URL of the secure server, wherein performing URL substitution is performed prior to selection by the client of a link embedded within the web page.

51. The secure server computer system as recited in claim 29, wherein the data request handling procedure is configured to perform an URL substitution for each link embedded in a web page presented to the client by the secure server such that the link is replaced with a URL of the secure server, wherein performing URL substitution is performed prior to selection by the client of a link embedded in the web page.

52. The method as recited in claim 22, wherein the data request handling procedure is configured to perform an URL substitution for each link embedded in a web page presented to the client by the secure server such that the link is replaced with a URL of the secure server, wherein performing URL substitution is performed prior to selection by the client of a link embedded in the web page.

53. The apparatus as recited in claim 21, wherein the data request handling procedure is configured to perform an URL substitution for each link embedded in a web page presented to the client by the secure server such that the link is replaced with a URL of the secure server prior to selection by the client of a link embedded in the web page.

54. The non-transitory computer storage medium as recited in claim 14, wherein the data request handling procedure is configured to perform an URL substitution for each link embedded in a web page presented to the client by the secure server such that the link is replaced with a URL of the secure server prior to presenting the web page to the client, thereby enabling the client to select a link embedded in the web page after URL substitution has been performed.

55. The client computer system as recited in claim 7, wherein the data request handling procedure is configured to perform an URL substitution for each link embedded in a web page presented to the client by the secure server such that the link is replaced with a URL of the secure server, wherein at least one of the processors or memory are further adapted for:

executing the data request handling procedure to perform URL substitution for each link embedded in a web page presented to the client by the secure server, wherein URL substitution is performed prior to presenting the web page to the client by the secure server, thereby enabling the client to select a link embedded in the web page after URL substitution has been performed.

56. The method as recited in claim 1, wherein the data request handling procedure is configured to perform an URL substitution for each link embedded in a web page presented to the client by the secure server such that the link is replaced with a URL of the secure server, wherein substituting an address of the secure server for a portion of each data request that is being directed to the internal server of the private network comprises:

executing the data request handling procedure to perform URL substitution for each link embedded in a web page presented to the client by the secure server, wherein URL substitution is performed prior to presenting the web page to the client by the secure server, thereby enabling the client to select a link embedded in the web page after URL substitution has been performed.

* * * * *